United States Patent
Piana et al.

(10) Patent No.: US 8,295,970 B2
(45) Date of Patent: *Oct. 23, 2012

(54) CUSTOMER-CREATED TEXTILES AND CUSTOMER-ORIENTED GARMENT DYEING MACHINE

(75) Inventors: Andrea Piana, Atlanta, GA (US); Sang-Hoon Lim, Kennesaw, GA (US)

(73) Assignee: Tintoria Piana U.S., Inc., Cartersville, GA (US)

( * ) Notice: Subject to any disclaimer, the term of this patent is extended or adjusted under 35 U.S.C. 154(b) by 263 days.

This patent is subject to a terminal disclaimer.

(21) Appl. No.: 12/869,909

(22) Filed: Aug. 27, 2010

(65) Prior Publication Data

US 2011/0016019 A1  Jan. 20, 2011

Related U.S. Application Data

(60) Continuation-in-part of application No. 11/689,213, filed on Mar. 21, 2007, now Pat. No. 7,848,841, and a continuation-in-part of application No. 12/041,015, filed on Mar. 8, 2008, now Pat. No. 7,788,754, and a continuation-in-part of application No. 12/727,481, filed on Mar. 19, 2010, which is a division of application No. 12/041,015.

(51) Int. Cl.
*G06F 19/00* (2011.01)

(52) U.S. Cl. ........ 700/133; 700/130; 700/131; 700/132; 705/16; 8/116.1; 8/478; 8/494

(58) Field of Classification Search .............. 700/4, 130, 700/131, 132, 133; 705/16; 8/115.51, 478, 8/494

See application file for complete search history.

(56) References Cited

U.S. PATENT DOCUMENTS

| 2,255,028 A | * | 9/1941 | Long ............................ 68/12.19 |
| 2,706,391 A | * | 4/1955 | Belcher et al. .................. 68/177 |
| 2,985,502 A | | 5/1961 | Kronsbein et al. |
| 3,165,910 A | * | 1/1965 | Thies ............................ 68/13 R |

(Continued)

FOREIGN PATENT DOCUMENTS

FR  2 682 130  4/1993

(Continued)

OTHER PUBLICATIONS

European Paent Office 0 635 594 Jan. 1995.

*Primary Examiner* — Lorna M Douyon
*Assistant Examiner* — Tri V Nguyen
(74) *Attorney, Agent, or Firm* — Whitham Curtis Christofferson & Cook, PC

(57) ABSTRACT

Customers obtain customized textile materials by selecting style, shape, size, pattern and color for an undyed textile product. Based on a selection made by the customer, the textile product is transformed by a dyeing operation performed on a single item (or multiple items selected to be dyed the same) to yield a product, such as a shirt, pants, or jacket, which has a color and pattern of his or her own choosing, in the size and style he or she desires. The process can be performed in a retail setting using a dye apparatus which allows the process to be viewed by the customer. To enhance the educational and entertainment experience of the customer, the dyeing operation can be performed in a transparent tank or water kettle in the retail outlet so that the customer can view, for example, the garment as it is being dyed to the customer's specifications.

14 Claims, 4 Drawing Sheets

U.S. PATENT DOCUMENTS

| | | | | |
|---|---|---|---|---|
| 3,379,038 | A | 4/1968 | Blancafort | |
| 3,429,149 | A * | 2/1969 | Ellner | 68/150 |
| 3,653,562 | A | 4/1972 | Kronsbein | |
| 3,698,855 | A | 10/1972 | Sutton | |
| 3,916,653 | A | 11/1975 | West et al. | |
| 4,196,231 | A | 4/1980 | Hubers | |
| 4,289,496 | A * | 9/1981 | Lister | 8/477 |
| 4,550,579 | A | 11/1985 | Clifford | |
| 4,550,679 | A | 11/1985 | Pipa et al. | |
| 4,756,037 | A * | 7/1988 | McFadyen et al. | 8/150 |
| 5,554,198 | A | 9/1996 | Poplin | |
| 5,633,722 | A | 5/1997 | Wasinger et al. | |
| 5,755,246 | A | 5/1998 | Carl et al. | |
| 6,068,666 | A * | 5/2000 | Amick et al. | 8/441 |
| 7,033,403 | B2 | 4/2006 | Bentham | |
| 2002/0066145 | A1 * | 6/2002 | Gupta et al. | 8/478 |
| 2003/0172687 | A1 | 9/2003 | Bartalucci et al. | |
| 2006/0015207 | A1 | 1/2006 | Weiser et al. | |
| 2006/0265816 | A1 | 11/2006 | Abbott et al. | |
| 2007/0226919 | A1 * | 10/2007 | Mheidle | 8/446 |

FOREIGN PATENT DOCUMENTS

| | | |
|---|---|---|
| FR | 2 839 323 | 11/2003 |
| JP | 11-189968 | 7/1999 |
| JP | 2004-154517 | 6/2004 |
| KR | 2001104406 | 11/2001 |
| WO | WO 2005103369 A1 * | 11/2005 |

* cited by examiner

CUSTOMER-CREATED TEXTILES AND CUSTOMER-ORIENTED GARMENT DYEING MACHINE

CROSS-REFERENCE TO RELATED APPLICATIONS

This application is a continuation-in-part application of U.S. patent application Ser. No. 11/689,213, filed Mar. 21, 2007, now U.S. Pat. No. 7,848,841, and the complete contents thereof are incorporated by reference. This application is also a continuation-in-part application of U.S. patent application Ser. No. 12/041,015 filed Mar. 3, 2008, now U.S. Pat. No. 7,788,754, which claims priority to U.S. patent application Ser. No. 11/689,213, now U.S. Pat. No. 7,848,841, and is a continuation-in-part application of U.S. patent application Ser. No. 12/727,481 filed Mar. 19, 2010, which is a divisional of U.S. patent application Ser. No. 12/041,015, now U.S. Pat. No. 7,788,754, and claims priority to U.S. patent application Ser. No. 11/689,213, now U.S. Pat. No. 7,848,841, and the complete contents of these applications is herein incorporated by reference.

BACKGROUND OF THE INVENTION

1. Field of the Invention

The present invention generally relates to a new business method for providing customers with customized textiles, such as apparel including shirts, pants, coats, etc., upholstery for furniture or use in vehicles, bed linens, etc., where the customer can obtain a fabric material that will have a size, style, pattern and color of his or her own choosing, and where the fabric material will be produced for that customer on a one-at-a-time basis. Further, the present invention provides a customer-oriented dyeing apparatus (e.g., a tank or water kettle) which allows the customer to view the textiles he or she is purchasing while they are being dyed to his or her specifications.

2. Background Description

Consumer choice for textile products is currently limited by the number of colors and patterns offered by a store or manufacturer. In the case of clothing, when a customer visits a store and tries on shirt, pants, suit, or other garments of interest, he or she may identify a style (i.e., cut, etc.) that he or she prefers, but may not be able to obtain the garment in a color he or she wants or in a pattern (e.g., faded, striped, etc.) he or she wants. The same is true when ordering garments from a catalog. In the paper or online catalog setting, the customer is presented with various clothing options, and each item may be selected only with a limited number of color and pattern choices. The manner in which other textile products (e.g., bed linens, upholstery, curtains, etc.) are currently marketed have similar shortcomings. What is needed is a way for customers to get exactly the color and pattern they desire, for a garment or other fabric material of interest, and to be able to provide the customer with the garment or other fabric material on a fairly rapid basis. In addition, it would be an advantage to provide a mechanism where the customer could see his or her custom made fabric material during the dyeing operation for educational and entertainment purposes.

SUMMARY OF THE INVENTION

According to the invention, a business method is provided which allows customers to obtain fabric materials, such as garments, bed linens, upholstery, etc. in a size, style (shape), pattern, and color specified by the customer. The customer selects the size and style he or she desires from undyed fabric materials. The undyed fabric materials can be obtained by weaving or knitting cationic cellulosic fibers (e.g., cotton, rayon, lyocell, bamboo fiber, Tencel®, Modal®, kapok, flax, rami, kenaf, abaca, coir, hemp, jute, sisal, and pineapple fiber) together with natural or synthetic fibers so as to provide patterns of interest. Patterns may also be created by, for example, varying ratios of cationic cellulosic fiber and natural or synthetic fibers in the yarn. The fabric material is then dyed, one time at a time using a dye which produces the color selected by the customer, under environmentally friendly conditions (no salts or alkalis or only very low levels of salts or alkalis; low temperatures), such that either no amount or very reduced levels of dye or harmful effluent are discharged. In the preferred embodiment, the anionic dye preferentially adheres to cationic cellulosic fiber (e.g., cationic cotton, etc.), as opposed to other fibers in the fabric or garment (e.g., natural cotton, etc.) such that, for example, fabrics or garments that are made from the different fibers and which are knitted or weaved into patterns or are made from yarns which have varying ratios of cationic cotton to natural cotton will have specific patterns, stripes, shade gradations, and other patterns of interest to customers. In some embodiments, the pattern could be made after the garment is created by selectively making regions of the garment cationic.

To enhance the educational and entertainment experience for a customer, it is preferred that dyeing is performed in a dyeing apparatus which is at least partially transparent. The tank could be, for example, on display in a store where the customer, as well as others in the store, could view the fabric, for example a shirt or other garment, being sprayed, with aqueous dye solution and/or dipped in and out of aqueous dye solution in the tank. This would allow the customer to see the fabric (e.g., garment) gradually change from one color to a desired color, and to see the pattern (if any) develop on the fabric (e.g., garment). For example, a garment holding rack can be connected to a spindle which either or both lifts the garment up and down in the tank or rotates the garment about its axis. For visual appeal, the garment holding rack can be mannequin shaped (i.e., the shape of a person's upper torso). Preferably, the mannequin will be perforated or made from flexible steel wire. During dyeing, the customer preferably would be able to view dye being applied to the garment and could see the garment being moved about within the tank to assure complete and even coverage of the garment with dye. After dyeing, the garment can be washed, and dye within the tank can be drained and the tank washed so as to permit dyeing the next garment (e.g., a one-at-a-time sequential production of different fabric or garment materials can be pursued in the tank so that customers can view different, customized garments or fabrics as they are being made).

For smaller fabrics, e.g., socks, handkerchiefs, and baby clothes, the dyeing apparatus can be in the form of a water kettle, such as a commercial electric water kettle, that is preferably made from clear glass. The aqueous dye solution would be brought to boil in the water kettle (this will take approximately 2 minutes or less). The small textile items, preferably in the form of cationic cellulosic fiber (which can be patterned), would be combined with the aqueous anionic dye solution, and dyeing would be performed over a short interval (e.g., 5 minutes or less). The customer would be able to observe the dyeing process in the glass kettle, and could stir the items and aqueous anionic dye solution using a glass rod for making the dyeing proceed evenly. A retail store may be equipped with a many water kettles to allow responding to customers in short periods of time (e.g., 10 minutes). The retail store may also include a tank device with a mannequin shaped garment holder in combination with multiple kettles. In addition, the small items being dyed using the aqueous dye solution in a water kettle, such as socks, doll clothes, stuffed animal clothes, or a baby cloth, may be embroidered with cationic cellulosic fibers (e.g., cationic cotton yarn, etc.) such that the embroidered part develops color after dyeing. This arrangement may allow customers to prepare customized baby clothing as newborn gifts, for example, in a short period of time.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE PREFERRED EMBODIMENTS OF THE INVENTION

An aspect of the present invention relates to a system and method for producing customer-created textile goods, such as garments, upholstery, linens, curtains, and towels, etc. By customer-created, we mean that the customer is able to choose a color and pattern of his or her own liking for a textile good of interest, and to have that textile good dyed for him or her as a single item such that he or she will be able to have a highly personalized textile product of his or her own choosing.

Garments available in a store are generally available in a limited number of colors and patterns. Some customers have different preference on color other than the colors displayed at a store. Those who desire individual color and pattern will hire a designer, but this process will be expensive and slow. In the present invention, by contrast, customers can choose color and pattern of the textile goods. The textiles goods are preferably dyed at a store while customers are waiting or shopping. However, within the practice of the invention, one could also order textile goods of interest online using the Internet or other network or communications platform, and select a textile good of interest to be colored and patterned according to the customers selected specifications.

Figure 1:
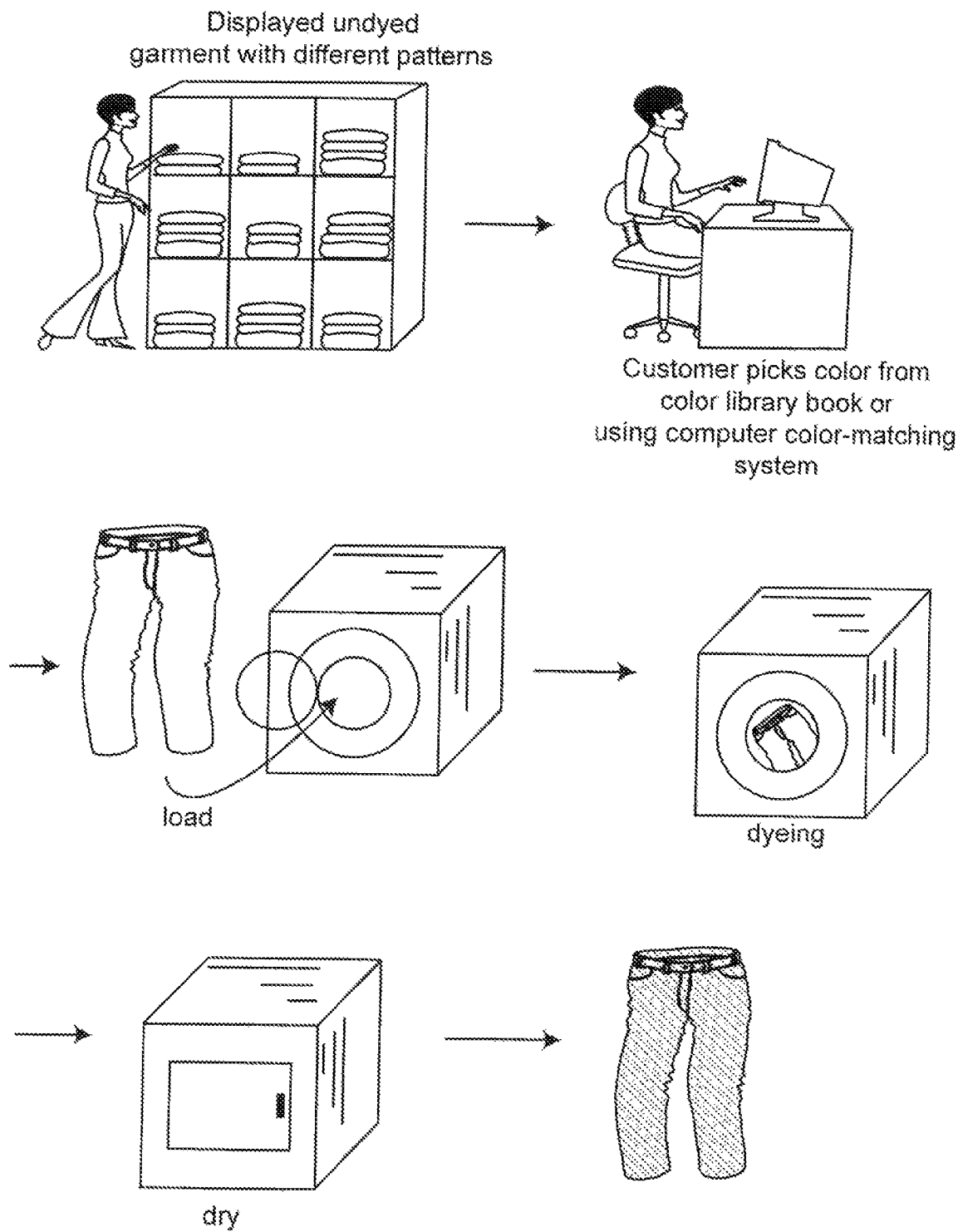
FIG. 1 shows a schematic of system components in a retail outlet, as well as process steps, where garments can be purchased and selectively dyed on the premises so as to achieve colors and patterns customized for individual customers.

FIG. 1 shows an exemplary embodiment of the invention wherein a customer selects an undyed garment of interest. The garment will have certain "style". The variations in style are limitless. For example, it will be recognized that a crew neck shirt, polo style shirt, button down shirt, V-neck shirt, and mock turtle neck shirt are all different "styles" of shirts, and it will be further recognized that different designers, e.g., Versace®, Ralph Lauren®, Calvin Klein®, Sean John®, Channel®, DK®, etc., all have different variations of these types of shirts and these would also be considered "style" within the practice of the invention.

The undyed garment of interest, depending on the materials used in its construction, may shrink during dyeing processes; thus, the retail outlet may include pre-shrunk garments for the customer to choose from and try on, and after he or she determines the appropriate size for themselves, the garment which will be selected will be of a size that will produce the size and pattern selected by the customer. In an online ordering situation, the customer would merely select the size that is appropriate for him or her, and the company which produces the selected garment will choose the appropriate sized undyed garment to produce the product of interest.

A variety of materials can be used to manufacture the undyed textile garments or other articles that are to be selected by the customer and used in the practice of this invention.

In the practice of the invention, the textile goods are preferably manufactured using cationic cellulosic fibers alone or together with other fibers.

Cotton is typically dyed using either direct dyes or fiber-reactive dyes. Both types of dyes are anionic (negative). Cotton develops a negative charge in water, which is a medium of dyeing. Since the dyes are negatively charged, the dye and cotton fiber repel each other. To overcome this electrical repulsion and for cotton to be dyed, a large amount of salts (up to equal amount to the weight of the fabric), such as sodium chloride or sodium sulfate, are added in traditional dyeing procedures. The high concentrations of salts in aqueous effluents can cause environmental problems. In addition to the use of salt, fiber-reactive dyes need alkali during dyeing, such as sodium carbonate or sodium hydroxide, to form strong covalent bonds between fiber and dye. These strong bonds provide good "washfastness" for the color. However, during dyeing, a significant amount of fiber-reactive dyes (10~40%) undergo hydrolysis and cannot be bonded to the fiber. To remove the un-reacted dyes, substantial washing time is required. In addition to the large amount use of water and energy, the dyes in the effluent cause environmental pollution. With direct dyes the washfastness is poor, and proper after treatment is required to get a better washfastness.

As an attempt to resolve some of the issues for traditional cotton dyeing, it is known to chemically modify cotton by introducing cationic (positive) charge on cotton (to create "cationic cotton"). One of the cationic reagents extensively studied for this purpose is 3-chloro-2-hydroxy propyltrimethylammonium chloride. One end of the cationic reagent carries a positive charge (quaternary ammonium salt group), while the other end has a reactive group that reacts with cellulosic fiber to form a covalent bond. The positive charges introduced on cellulosic fibers are strongly attractive to anionic dye molecules. A variety of procedures are known for creating cationic cellulosic fibers are described in U.S. Pat. Nos. 3,685,953, 4,072,464, and in Michael Rupin, Dyeing with Direct and Fiber Reactive Dyes, Textile Chemists and Colorist, Vol. 8, No. 9, p 54 (1976)), the complete contents of each of which is herein incorporated by reference, and the procedures described therein can be practiced within the scope of the present invention to produce cationic cellulosic fibers for use in the fabrics or garments that are to be made in a customized fashion as contemplated herein. This cationic treatment can be done for any kind of cellulosic fibers. Cellulosic fibers include, but not limited to, cotton, rayon, lyocell, bamboo fiber, Tencel®, Modal®, kapok, flax, ramie, kenaf, abaca, coir, hemp, jute, sisal, and pineapple fiber. Cationic cellulosic fibers are commercially available from Tintoria Piana U.S., Inc (Cartersville, Ga., USA)

The other fibers which may be used in the textile garments or other articles or fabrics in combination with the cellulosic fibers can vary widely and include, but are not limited to, natural fibers including cotton, wool, silk, bamboo, kapok, flax, kenaf, abaca, coir, hemp, jute, sisal, pineapple, etc., as well as materials made from synthetic or man-made fibers including, but are not limited to, rayon, lyocell, Tencel®, Modal®, polyester, nylon, acrylics, spandex, etc. For example, amount of cationic cellulosic fibers (e.g., cationic cotton, etc.) used in the textile products can range from 1-100% by weight. To achieve different effects, the cationic cotton might constitute 20%-80%, 40%-60%, approximately 50% by weight, and the amount of cationic cellulosic fibers can vary in different physical regions of the textile product (e.g., to create patterns of interest). Cationic cellulosic fibers (e.g., cationic cotton, etc.) develops a proper color under the dyeing conditions which would be used in the practice of this invention such as when using anionic dyes, with either no salt or no alkalis or with low levels of such agents, at low temperatures (below 212 F), etc.

The cationic cellulosic fibers (e.g., cationic cotton, etc.) have a strong attraction to anionic dyes, such as direct dyes, fiber-reactive dyes, and acid dyes. Examples of direct dyes include Solphenyl®, Everdirect®, etc. Examples of fiber-reactive dyes include Cibacron®, Sumifix®, Evercion®, etc. Examples of acid dyes include Everlan®, Leadacid®, etc. The strong attraction between cationic cellulosic fiber and the anionic dyes leads to outstanding washfastness. The cationic cellulosic fiber can be dyed with anionic dyes without the addition of salt or alkali. The fabrics and garments made with cationic cellulosic fiber can be dyed much quicker and dyed at a lower temperature than traditional cotton dyeing (e.g., at temperatures lower than 200 F). In addition, the dyeing using cationic cellulosic fiber is environmentally friendly because there are much smaller amounts of unfixed dyes resulting from the process, and no salt or alkali in the wastewater (see, e.g., Lance Frazer, Innovations—A Cleaner Way to Color Cotton, Environmental Health Perspectives, Vol. 110, No. 5 (May 2002); and Peter Hauser, Reducing Pollution and Energy Requirements in Cotton Dyeing, Textile Chemists and Colorist & American Dyestuff Reporter, Vol. 32, No. 6 (June 2000)), both of which are incorporated herein by reference.

Since normal cellulosic fiber (e.g., natural cotton), for example, needs salts and (or) alkali to be dyed, when cationic cellulosic fiber (e.g., cationic cotton fiber, etc.) is blended with natural cotton fiber to make a yarn, the yarn can produce heather (mélange) effect under a dyeing condition without salt and (or) alkali. Using yarns comprising varying amounts of cationic cellulosic fiber (e.g., ratios of cationic cotton to natural cotton ranging from 1/99 to 99/1 percent by weight), a fabric with stripes of different shade gradations can be produced. Using yarns made with cationic cotton (or other cationic cellulosic fibers) and natural cotton (or other natural or synthetic fibers that are not cationic) for weaving and knitting, a number of exciting colored patterns can be created. Since natural cotton cannot be dyed without the addition of salt or salt/alkali, but cationic cotton can be easily dyed without addition of salt and alkali, the garments are preferably dyed without adding salt and alkali in the practice of the invention such that the garments develop a special look, such as a heather look; stripes, or a blue jean look, depending on the combined use of, for example, natural and cationic cotton. In some embodiments, it may also be possible to selectively make portions of a garment made of cationic cellulosic fibers so as to produce a patterned garment with cationic cellulosic fibers and normal (non-cationic) cellulosic fibers.

In a retail store embodiment, the garment is displayed as undyed, but each garment has a pattern that will be developed after dyeing which depends on the weave, the knitting pattern, or the ratio of cationic cellulosic fibers to other fibers in the yarn (which itself can vary in a pattern throughout the textile article being produced).

As shown in FIG. 1, in operation, a customer chooses any color from a color library and chooses a garment with a specific pattern. A customer can bring a color that he (she) prefers to the retail outlet where the color can be matched using a commercial color-matching system. The garment is loaded in an in-store garment dyeing machine. Water is added to give, for example, a water to goods ratio of 5:1 to 20:1, although it should be understood that the ratio can vary greatly depending on a number of criteria. Pre-dissolved anionic dye is slowly added to the machine. Basically, any kind of anionic dye can be used for this process, but preferably fiber-reactive dyes are used. The dyeing machine is heated to a target temperature (70 F~212 F) and run for 1~60 minutes. While dyeing the garment, a customer can watch the garment dyed through a window or transparent wall of the machine and may be able to see transport of dye and fluids through transparent hoses or other connections on the machine. At the end of dyeing cycle, a customer can see a clear dyeing bath since most or all dyes were exhausted into the garment, which provides the customer with the assurance that the process is environmentally friendly. The machine is cooled and drained. The garment is rinsed with warm water and extracted. The dyed garment is dried in a commercial drier. Customers can get a garment at their color and pattern preference while they are waiting at the store. Also, the dyeing with cationic cotton is environmentally friendly because dye is almost completely exhausted. The invention can be practiced with garments, as well as other textile products such as upholstery, linens, towels, etc.

The invention may also be practiced in an online ordering situation. The invention provides the advantage that the customer gets a unique, custom-made garment having a particular pattern and color he or she desires. In some application, the customer can cause the pattern to be modified by choosing a garment size and style, and, in addition to choosing a color, he or she can choose the knit or weave pattern (or other pattern) of the cationic cellulosic fiber with the other fibers in the garment, or the ratio of cationic cellulosic fiber to other fibers used throughout the garment or textile article, or at various locations within the garment or textile article itself (e.g., the arms of a shirt may be 100% cationic cotton to yield a solid color, while the chest and back region can be, for example, 50% cationic cotton 50% natural cotton to give a blue jean like finish—one where only some of the yarn is colored and some is not). After creation of a customer textile product of a desired color and pattern, the customer may also have the option of having a monogram or other symbol embroidered or imprinted on the product. Embroidery and monogram features using cationic cellulosic fibers can be present in the garment of fabric before dyeing so that the embroidered part can be dyed during the dyeing process.

In one embodiment of a retail setting, particularly where small garments such as socks, handkerchiefs, baby clothing and accessories (towels, blankets, bibs, etc.), clothing for dolls and/or stuffed animals, etc. are to by dyed, could include the use of a plurality of water kettles, e.g., commercial electric water kettles. These kettles can be filled with aqueous dyeing solution and brought a boil in a short period of time (on the order of two minutes). The small fabric materials can be added to the kettles and stirred using a glass stirring rod or other device. The small fabric materials could be effectively dyed within 2-10 minutes, and then rinsed and dried. Preferably, the kettles would be made of a glass material which enables the use to view the material during dyeing. By using several kettles, several customers products could be customized through dyeing simultaneously. In addition, for small items dyed in a water kettle, the customers may be permitted to stir the aqueous solution and participate in the dyeing process (stirring assures more uniform coverage). The fabric material could be constructed from cationic cellulosic fibers (e.g., cationic cotton, etc.) or could be embroidered with cationic yarn such that the embroidered part is dyed. As discussed above, the fabric could have any style chosen by the customer.

Another aspect of the invention is focused on providing a customer-oriented garment dyeing machine which can, for example, enhance the customer's educational and entertainment experience within a retail outlet where he or she has ordered a custom dyed fabric. For exemplary purposes, this aspect will be explained in the context of dyeing a shirt; however, it should be recognized that the customer-oriented dyeing machine can accommodate any type of garment or fabric material. The main focus of this aspect of the invention is to allow the customer, and others which may be present in the retail outlet, to see the dyeing operation being performed. The garment dyeing machine allows for one-at-a-time production of custom dyed garments. In cases where having two or more items dyed the same (e.g., a pair of socks) the two or more items can be dyed in the dyeing apparatus simultaneously.

Figure 2:
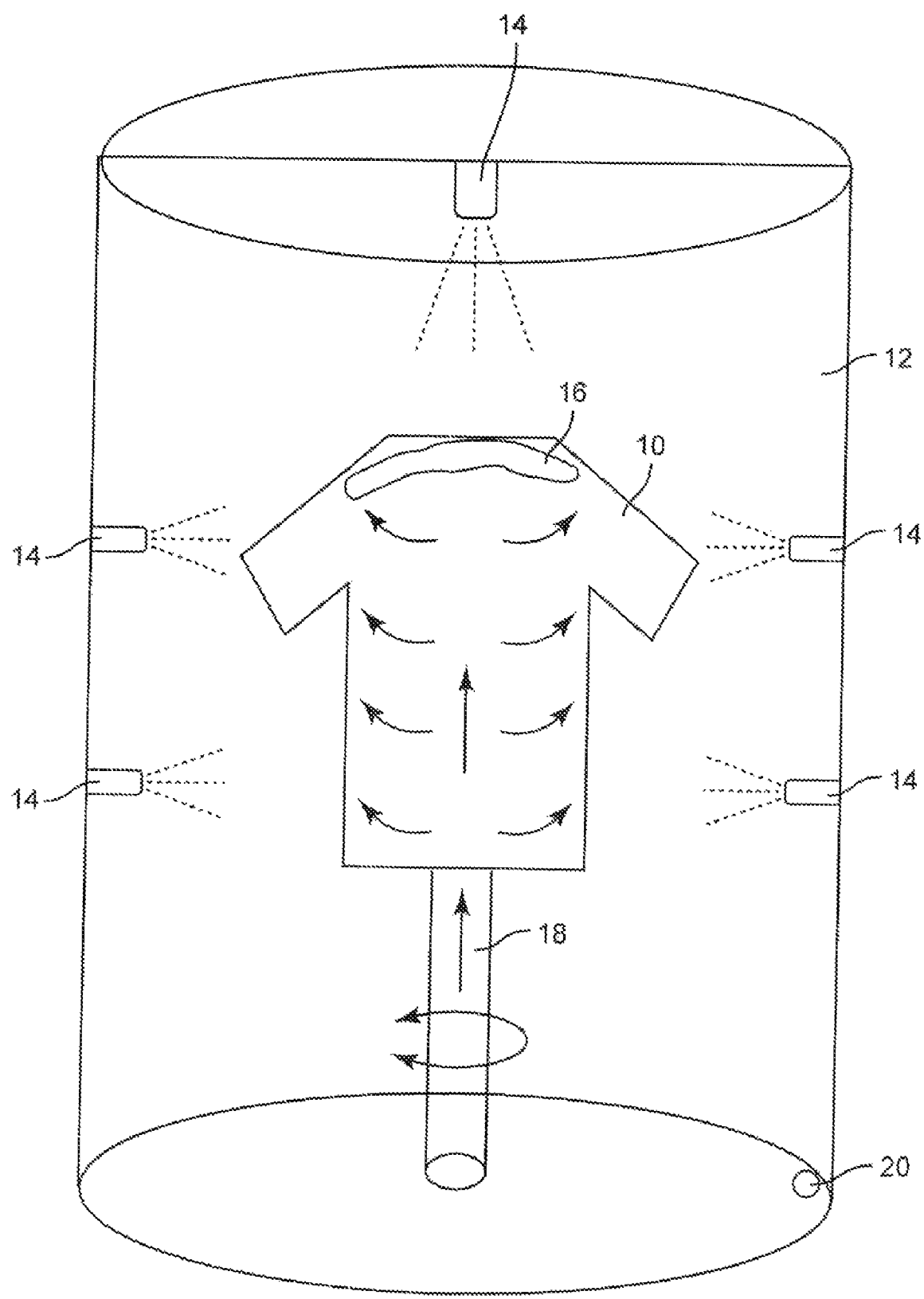
FIG. 2 shows an exemplary transparent dye bath with spray nozzles used to dye a garment.

FIG. 2 shows one example of a customer-oriented garment dyeing machine. In particular, a garment 10, is placed in a tank 12 where it is sprayed with aqueous dye solution using one or more nozzles 14 positioned within the tank 12. In the preferred embodiment, the tank 12 has a cylindrical, plexiglass or glass sidewall which allows anyone to view the dyeing operations progressing in the tank. Other configurations of the tank 12 may be employed; however, it is desired that in any configuration at least a portion of the sidewalls of the tank are transparent. While FIG. 2 shows that the nozzles 14 are stationary within the tank, one or more of the nozzles could be moveable (e.g., rotatable about the garment 10) within the tank 12. In the preferred embodiment, the nozzles 14 are positioned at different heights within the tank 10, as well as above the garment 10, for better coverage of the garment 10. Preferably, a garment holding rack, shown in dashed lines for exemplary purposes in a hanger form 16, is connected to a spindle 18. It is most preferred that a mannequin made of flexible wire or a perforated mannequin be used instead of a hanger form 16. Use of flexible wire allows accommodating different sized garments. A garment holding rack in a hanger form 16 has the advantage in that it can accommodate different kinds of garments (e.g., shirts and jeans) inside the tank. The spindle 18 can move the garment 10 either or both up and down within the tank 12 or rotate the garment 10 about its axis within the tank 12. Rotation and up and down movement of the garment 10, helps assure dye coverage in a uniform and even manner. The arrows in the spindle and on the T-shirt indicate the dye solution can flow inside the spindle and inside a perforated mannequin garment holding rack, for example. In the preferred embodiment, the dye is circulated from inside the mannequin through the fabric of the T-shirt, for example, and the nozzles are used to assist in making the dyeing more even by application of a fine spray. A drain 20 can be used to re-circulate the dye at the bottom of the tank 12 back through the spindle 18 and out through either a mannequin shaped holding rack or through the nozzles 14 until the dyeing operation is completed. After completing dyeing of the garment 10, the nozzles 14 can be used to spray water on the garment 10 to rinse the garment of excess dye. Also, the tank 12 can be filled completely with water to rinse the garment. Alternatively, a hose assembly (not shown) or other means for washing the garment 10 and tank 12 can be used. In addition, the water sprayed by the nozzles 14, or the hose assembly, could also wash the inside of the tank 12 and prepare it for receiving the next garment for dyeing. The wash water could be removed through the drain 20 (or another outlet port (not shown)).

Figure 3:
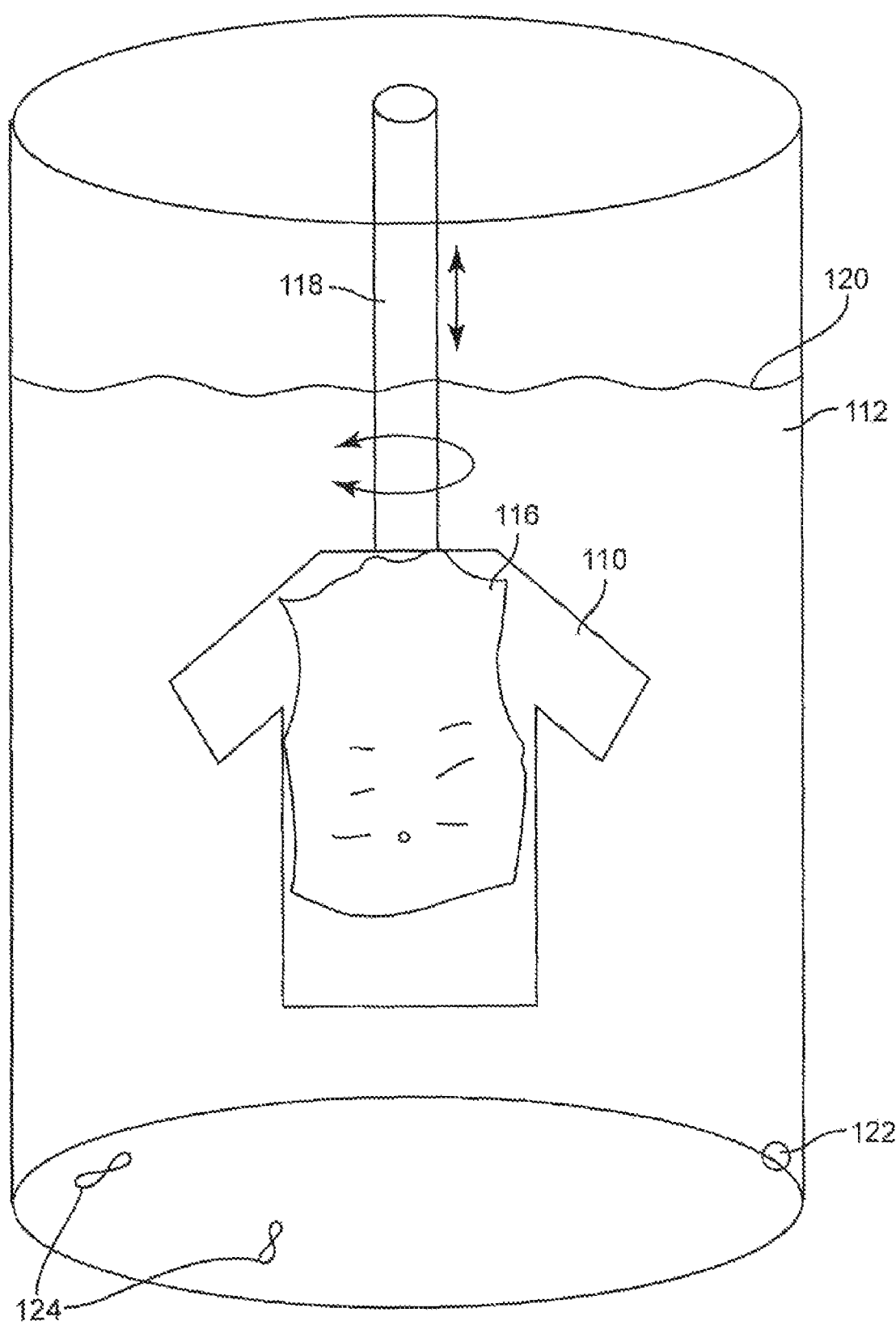
FIG. 3 shows another exemplary transparent dye bath where the garment is dipped in a dye solution filling the tank.

FIG. 3 shows another example of a customer-oriented garment dyeing machine. Similar to a the example shown in FIG. 2, FIG. 3 shows a garment 110 positioned within a transparent, cylindrical plexiglass tank 112. For visual effect, the garment 110 can be positioned on a garment holding rack 116 which is in the shape of a mannequin torso which will enhance the three dimensional character of the garment during dyeing (it being understood that this same garment holding rack 116, as well as other forms of the rack, can be used in the garment dyeing machine shown in FIG. 2 and vice versa). A spindle 118 is connected to the garment holding rack 116 and may be used to either or both move the garment 110 up and down within tank 112 or rotate the garment 110 about its axis as is indicated by the double headed arrows. The tank 112 is filled with aqueous dye solution 120 which is used to dye the garment 110 to the customer's specifications. The aqueous dye solution 120 can be added and drained from the tank through one or more ports 122. The aqueous dye solution 120 can be circulated within the tank 112 using one or more impellers 124 or other suitable devices positioned within the tank. By repetitively lifting the garment 110 above the top of the aqueous dye solution 120 in tank 112 using the spindle 118, the customer is able to see the progress of the dyeing operation. Rotation of the garment 110 can also enhance the dyeing operation as well as the customer's perception of the dyeing operation. After dyeing, the garment 110 will be washed to remove excess dye and the inside of the tank 112 can be washed. Washing can be accomplished using a spray nozzle, or by filling the tank 122 or by other means.

Figure 4:
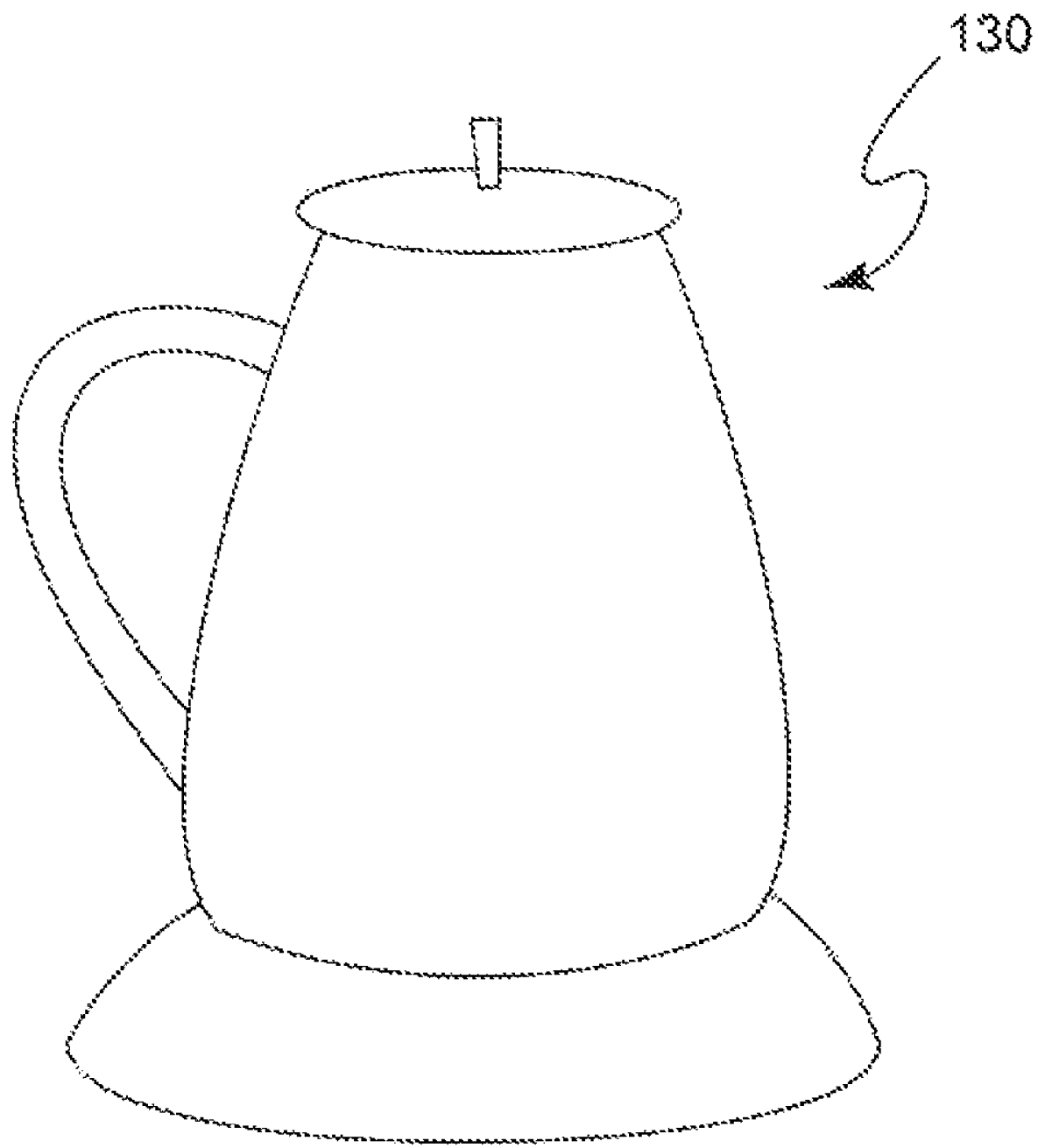
FIG. 4 shows an example of a glass water kettle that could be used as a dyeing apparatus.

FIG. 4 shows an example of a water kettle 130 or "coffee pot" type device, which is preferably made of glass to allow a person to observer a garment inside the water kettle 130 while it is being dyed.

The following examples illustrate a number of applications of the invention; however, it will be clear that the invention can be practiced in a number of different ways not specifically set forth below.

EXAMPLE I

A customer chooses an undyed knit shirt having stripes made from cotton yarns containing different levels of cationic cotton. The customer chooses a red color. The shirt is loaded in a garment dyeing machine. Predissolved red fiber-reactive dye (1% on weight of garment) is added to the machine at the liquor to goods ratio of 15:1. The dyeing bath is heated to 180 F and run for 10 min. The bath was cooled, drained, rinsed with warm water, and extracted. The dyed garment was dried using a commercial drier. The final dyed shirt is obtained with red stripes with shade gradations.

EXAMPLE II

A customer chooses undyed pants woven with cationic cotton yarn as warp and natural cotton yarn as filling. The customer chooses a blue color. The pants are loaded in a garment dyeing machine. Predissolved blue fiber-reactive dye (2% on weight of garment) is added to the machine at the liquor to goods ratio of 15:1. The dyeing bath was heated to 180 F and run for 15 min. The bath was cooled, drained, rinsed with warm water, and extracted. The dyed garment was dried using a commercial drier. The final dyed pants are obtained with blue jean look.

EXAMPLE III

A customer chooses an undyed knit shirt made with cotton yarn containing 100% cationic cotton. The customer chooses a blue color. The shirt is loaded in a garment dyeing machine. Predissolved blue fiber-reactive dye (1% on weight of garment) is added to the machine at the liquor to goods ratio of 15:1. The dyeing bath was heated to 180 F and run for 10 min. The bath was cooled, drained, rinsed with warm water, and extracted. The dyed garment was dried using a commercial drier. The final dyed shirt is obtained with solid blue color.

EXAMPLE IV

A customer chooses an undyed knit shirt made with cotton yarn made by blending 50% cationic cotton and 50% natural cotton. The customer chooses green color. The shirt is loaded in a garment dyeing machine. Predissolved green fiber-reactive dye (1% on weight of garment) is added to the machine at the liquor to goods ratio of 15:1. The dyeing bath was heated to 180 F and run for 10 min. The bath was cooled, drained, rinsed with warm water, and extracted. The dyed garment was dried using a commercial drier. The final dyed shirt is obtained with blue heather look.

EXAMPLE V

A customer chooses an undyed woven curtain fabric having stripes made from cotton yarns containing different levels of cationic cotton. The customer chooses a blue color. The fabric is loaded in a garment dyeing machine. Predissolved blue fiber-reactive dye (1% on weight of garment) is added to the machine at the liquor to goods ratio of 15:1. The dyeing bath is heated to 180 F and run for 10 min. The bath was cooled, drained, rinsed with warm water, and extracted. The dyed fabric was dried using a commercial drier. The final curtain fabric is obtained with blue stripes with shade gradations.

EXAMPLE VI

A customer chooses undyed socks having stripes made from cotton yarns containing different levels of cationic cotton. The customer chooses a blue color. The socks are loaded in a water kettle with predissolved blue fiber-reactive dye (1% on weight of goods) at the liquor to goods ratio of 15:1. The kettle is heated to a boil and dyeing proceeds with stirring of the socks in the kettle 10 min. The socks were then rinsed with warm water, extracted and placed in a drier to produce socks with blue strips having shade gradations.

While the invention has been described in terms of its preferred embodiments, those skilled in the art will recognize that the invention can be practiced with considerable modification within the spirit and scope of the appended claims.

Having thus described our invention, what we claimed as new and desire to secure by Letters Patent is as follows:

1. A business method of producing customized dyed fabric materials in a retail environment, comprising the steps of:
   a) providing a selection of fabric materials which include at least some cationic cellulosic fibers, said fabric materials being constructed so, as to provide patterns of interest which correspond to varying amounts of cationic cellulosic fiber in the fabric materials;
   b) providing a customer with said selection for selecting a fabric material, and for the selected fabric material selecting a size, pattern, and color;
   c) placing the selected fabric material which will produce the selected pattern in a dyeing apparatus,
   said fabric material placed in said dyeing apparatus having a pattern which is a function of a varying content or distribution of cationic cellulosic fiber in said fabric material;
   d) dyeing said fabric material with an anionic dye which produces said color selected in said selecting step;
   e) allowing a customer to view said fabric material in said dyeing apparatus during said dyeing step;
   f) repeating steps a-e for additional fabric materials; and
   g) delivering to customers the selected and dyed fabric material of their color and pattern preference while said customer is waiting or shopping at the retail environment.

2. The business method of claim 1 wherein said fabric material is clothing containing cationic cellulosic fiber.

3. The business method of claim 2 wherein said cationic cellulosic fiber is selected from cotton, rayon, lyocell, bamboo fiber, kapok, flax, rami, kenaf, abaca, coir, hemp, jute, sisal, and pineapple.

4. The business method of claim 2 further comprising the step of selecting a style of said clothing.

5. The business method of claim 1 herein said fabric material is selected from upholstery, linens, curtains and towels containing cationic cellulosic fiber.

6. The business method of claim 1 herein said selecting step is performed by computer over a network.

7. The business method of claim 1 wherein said selecting step includes the step of color matching to identify said color.

8. The business method of claim 1 wherein said fabric material is constructed from cationic cotton and natural cotton.

9. The business method of claim 1 wherein said dyeing step is performed using heating temperatures of 212 F or lower.

10. The business method of claim 1 wherein said anionic dye is one of a fiber-reactive, direct, and acid dye.

11. The business method of claim 1 wherein said dyeing step is performed without salt or alkali.

12. The business method of claim 1 wherein said dyeing step is performed with an amount of dye which is exhausted during said dyeing step.

13. The business method of claim 1 further comprising the step of allowing a customer to view dye in lines connected to said dye apparatus during said dyeing step.

14. The business method of claim 1 wherein said dyeing apparatus is a water kettle made of glass.

* * * * *